April 14, 1959     J. M. WUERTH     2,882,034
ACCELEROMETER AND INTEGRATOR

Filed Nov. 1, 1948     2 Sheets-Sheet 1

JOHN M. WUERTH
INVENTOR.

BY *William R. Lane*
ATTORNEY

April 14, 1959     J. M. WUERTH     2,882,034
ACCELEROMETER AND INTEGRATOR
Filed Nov. 1, 1948     2 Sheets-Sheet 2
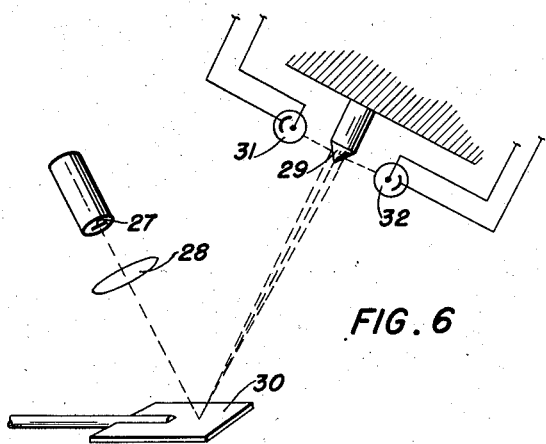
JOHN M. WUERTH
INVENTOR.
BY William R. Lane
ATTORNEY

United States Patent Office 2,882,034
Patented Apr. 14, 1959

2,882,034

ACCELEROMETER AND INTEGRATOR

John M. Wuerth, Pico, Calif., assignor to
North American Aviation, Inc.

Application November 1, 1948, Serial No. 57,686

23 Claims. (Cl. 264—1)

This invention pertains to an integrating accelerometer comprising a mechanical means which may be used as a differentiator or an integrator.

The invention more particularly pertains to the use of a rotating mass as the basis for a mechanical differentiator or integrator.

It is an object of this invention to provide a mechanical means for utilizing inertia reaction forces for integration purposes.

It is a further object of this invention to provide a method of integration amounting to a correlation between applied torque and angular position of a system functioning under the action of such torque.

It is a further object of this invention to utilize inertia forces such as encountered in the angular rotation of a flywheel in conjunction with an applied torque for purposes of differentiation and integration.

It is still another object of this invention to provide a mechanical device adapted to obtain the second derivative or integral, as the case may be, of an arbitrary input.

It is still another object of this invention to provide an electromechanical device for the measurement of acceleration in space.

It is still another object of this invention to provide a mechanical device adapted to obtain directly the first and second integrals of any acceleration.

Other objects of invention will become apparent from the following description taken in connection with the accompanying drawings, in which Fig. 1 is a schematic elevational view of an arrangement of the invention;

Fig. 6 is a modified form of indicator means; and

Fig. 7 is a combined perspective and schematic view showing an all-purpose arrangement of the invention in a somewhat different physical form than that of the preceding figures.

Figure 4:
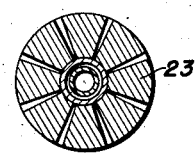
Fig. 4 is a section taken generally along 4—4 of Fig. 3.
Figure 3:
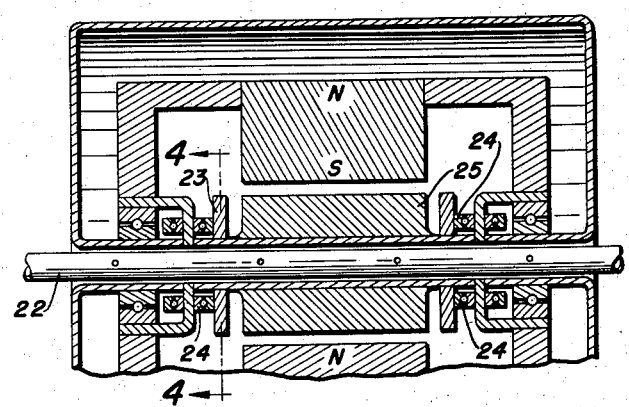
Fig. 3 is a motor flywheel arrangement of the invention having an air bearing associated therewith.

Referring now to the drawings, a platform or frame 1 is suitably mounted upon a reference support 2 by means of low friction bearing means 3, such as knife-edge bearings. Suitably mounted on the frame and carried thereby is a reversible electric motor 4 and a rotatably driven shaft 5 adapted to support a flywheel 6 and attached coaxially or otherwise to drive a small generator 15 also rigidly supported by platform 1. Detailed cross sections of motor 4, supported on hollow shaft 22 by an air bearing, are shown in Figs. 3 and 4, in which radial commutator strips 23 attached to rotor 25 are contacted by planetary brushes 24. All the foregoing parts are provided to minimize friction. Extending from platform 1 is an arm 7 constituting a part of a pickoff system adapted to measure angular deflection of the platform with respect to the non-rotating support 2. This pickoff system comprises a plate unit 8 operatively positioned between plates 9 and 10 of a condenser system. The relative position of plate 8 with respect to plates 9 and 10 results in a signal indicative of the angular position of platform 1 with respect to support 2. This signal is obtained by way of a resonant bridge network responsive to the condition of unbalance occasioned by the position of the center plate 8 with respect to either plate 9 or plate 10.

Figure 5:
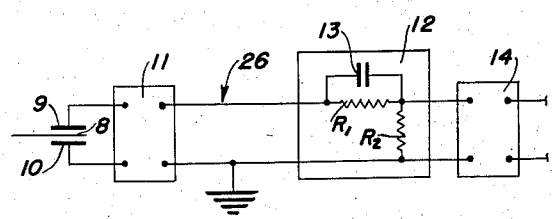
Fig. 5 is a diagrammatic arrangement of the electrical hookup pertaining to the invention.

Referring now to Fig. 5 there is provided a circuit comprising a discriminator 11 and a derivative control arrangement 12 including a capacitance 13 and resistances $R_1$ and $R_2$. Also included in the circuit is a voltage amplifier 14 for a purpose to be more fully described. The relative unbalance of plate 8 with respect to plates 9 and 10 results in an unbalance of capacitance which is fed to discriminator 11. When the center plate 8 moves toward one of the fixed plates the capacities of the two sides of the resonant bridge network become unbalanced, moving one of the oscillators of the bridge network toward resonance and the other away from resonance. The discriminator measures the difference in the amplitude of the oscillations in the two sides of the bridge network and provides a direct current control signal proportional to the deviation of the central plate 8 from its central position. This results in a control signal proportional to the relative position of the pickoff arm 7 with respect to the support 2.

Thus the direct current voltage emanating from the discriminator is indicative of the position of pickoff arm 7. The output voltage from the derivative control network 12 serves to control the speed and direction of the motor, as will hereinafter be further described.

As an alternative arrangement to the electrical pickoff and discriminator illustrated in Fig. 5, a photocell arrangement as illustrated in Fig. 6 may be used.

Figure 2:
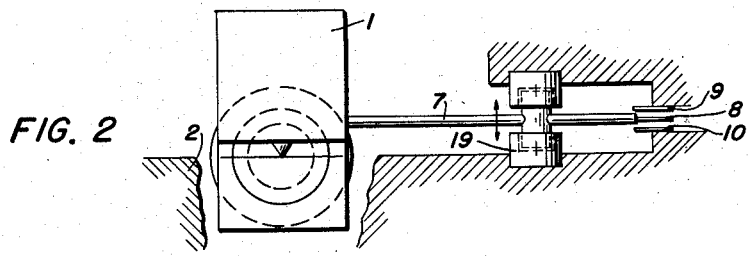
Fig. 2 is an end view of the device illustrated in Fig. 1.

The pickoff system illustrated in Fig. 6 comprises an illuminated slit 27 and an optical system 28 to focus this slit on a prism 29, as shown. Between the slit and the prism the light is reflected from a mirror 30 which is rigidly attached to the platform. (This mirror replaces the pickoff arm indicated in Fig. 2.) Any slight angular rotation of the platform moves the slit image across the face of the prism, thereby changing the amount of light which is deviated by the prism in each direction (to one or the other of photoelectric cells 31 or 32 to be energized thereby). The resulting protocell current is passed through a resistor (not shown) and the voltage drop across this resistor is a measure of the angular rotation of the platform. This voltage is then used in place of the discriminator output voltage in the circuit previously described. The optical pickoff has the advantage that no torques are applied to the platform. Any other low-coercion pickoff control devices can be used in lieu of those described above, such as the electromagnetic pickup.

This arrangement is satisfactory provided there is no oscillation of the platform. However, in actual practice only slight time lag in the control circuit would tend to lead to instability of the system and result in oscillations continuously increasing in amplitude. Physical damping in the form of a drag about the main bearing would directly introduce error torques into the system and create an accuracy problem. To avoid this difficulty, control circuit damping is provided in this invention.

Therefore, the next stage of the control circuit is a derivative control network 12. The function of this network is to provide an output voltage containing two components—one component is directly proportional to the input voltage and the other component is directly proportional to the rate of change of the input voltage. The schematic circuit indicated in Fig. 5 provides the desired result to a close approximation. When a steady input voltage is applied to the derivative control network the output voltage is a constant proportion of the input voltage, the constant of proportionality being equal to $$\frac{R_2}{R_1+R_2}$$

When an increasing voltage is applied to the input, the output voltage is increased over the value it would have for a steady input voltage due to the fact that the additional current flows through the capacitor during changes.

The foregoing arrangement is designed to utilize inertial reaction forces for integration. When a torque is applied to a system possessing inertia, e.g., one containing a flywheel, the time rate of change of angular momentum of the system is equal to the applied torque, and the angular acceleration of the system is proportional to the applied torque. Also, the angular acceleration is the second time derivative of the angular position, and the angular velocity is the first time derivative of the angular position. Therefore, the angular velocity is a measure of the first time integral of the applied torque, and the angular position is a measure of the second time integral of the applied torque. Conversely, the second time derivative of the angular position is directly proportional to the applied torque and therefore the angular position itself is a measure of the second time integral of the applied torque.

When a torque is applied to an inertial reservoir comprising a flywheel, the acceleration of the flywheel is directly proportional to the torque. The angular velocity of the flywheel is directly proportional to the first integral of the torque, and the angular position of the flywheel is directly proportional to the second integral of the torque.

Accordingly, in this invention the first and second integral, respectively, of the torque input is obtained by measurement of the angular velocity and angular position, respectively, of the flywheel. Also, by utilizing an arbitrary input for controlling the position of the flywheel without applying external torque to the system, the reaction torque caused by the motion of the flywheel is a direct measure of the second time derivative of the input signal. Further, controlling the velocity of the flywheel by an external means without applying external torque to the system develops a reaction torque which is directly proportional to the first time derivative of the velocity.

Applying these principles to applicant's arrangement, there is illustrated a mechanism for transferring the torque from a non-rotating member to a rotating flywheel. The platform 1 is free to rotate about an axis deteremined by the knife-edge bearings 3. When a torque is applied to the platform it tends to cause motion about such axis. This motion is detected by the pickoff system which feeds a control signal to the motor, which in turn is rigidly attached to the platform. The motor applies a torque to the flywheel and simultaneously applies an equal and opposite torgue through the motor to the platform. It is to be noted that the flywheel may be distinct from the motor and generator, or integral with them, as shown in Fig. 7. At any rate it is desirable to shield the rotating parts to eliminate, as far as possible, exterenal torques due to air drag. The pickoff system continuously varies the control signal to the motor in such a manner that only infinitesimal rotation of the platform may result; i.e., the torque output of the motor is always maintained equal and opposite to the applied torque so that the net torque applied to the platform is zero. The torque applied to the flywheel by the motor is therefore always equal to the external torque applied to the platform and, consequently, as hereinbefore explained, the flywheel position will be the double integral of the torque applied to the platform. As a means for measuring the angular velocity a small electric generator 15 is provided. The voltage output of this generator is proportional to and, hence, is a measure of the angular velocity of the rotating mass. Similarly, the angular position is measured by a revolution counter such as revolution counter 37 in Fig. 7, to be further described below. Alterenatively, if an arbitrary input can by some means control the position of the flywheel without applying external torques to the system, the reaction torque caused by the motion of the flywheel is a direct measure of the second time derivative of the input signal. Alternatively, if the velocity of the flywheel can be controlled by an external means without applying external torque to the system, the reaction torque developed will be directly proportional to the first time derivative of the velocity.

Figure 1:
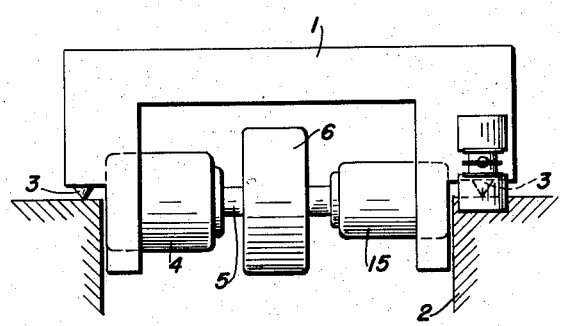

Accordingly, when it is desired to utilize this invention as a differentiator, provision is made for disconnecting the motor 4 in Fig. 1 from the voltage amplifier 14 and for supplying an independent source of power to the motor and rotatable mass 6. The velocity of the motor may be caused to obey any time function by means of the arrangement shown in Fig. 7. The function to be differentiated is furnished in terms of a voltage varying with time. The output of generator 15a and the variable voltage to be differentiated are fed to a comparator 17 which generates a signal proportional to the difference between the two voltages. This signal is amplified in amplifier 18 and used to drive motor 4a so that its speed always varies with time according to the function to be differentiated. The angular displacement of the motor may similarly be caused to obey any time function by means of the above arrangement. A potentiometer 20 is attached with suitable mechanical advantage to shaft 5a, as shown in Fig. 7, so that the voltage across it varies directly with the angular displacement of the shaft. This voltage is then compared in comparator 17 with the input voltage to be differentiated, as above, and the difference voltage is used by means of the amplifier to drive the motor so that its angular displacement always follows the desired function of time. Then the reactive torque of the motor and rotating mass on the rigid frame is a measure of, and directly proportional to, the first derivative of the angular velocity of the motor and to the second derivative of the angular displacement thereof.

The reactive torque is measured by the pickoff arrangement previously described, except that, as noted above, the output of the pickoff and amplifier circuit does not drive the motor. That output now drives an electromagnate actuating means 19 mounted on frame 2a for the purpose of balancing the reactive torque applied to platform 1a by motor 4a. The attachment of the upper part of actuating means 19 to frame 2a is not shown in Fig. 7 for the sake of clarity. When the pickoff arm 7 is displaced slightly by the reactive torque of the motor on the frame a signal is fed by the pickoff through the discriminator, derivative control network, and amplifier to the coils of the electromagnetic actuating means in the manner required to restore the pickoff arm to its original undisplaced position. The current in the coils of the electromagnets and the discriminator output are measures of the reactive torque of the motor on the frame and, hence, are measures of the first derivative of the angular velocity of the motor and of the second derivative of the angular displacement of the motor. The discriminator output may be measured at 26 in Fig. 5, or the current in the coils may be measured by an ammeter 21, connected in series with the coils as shown in Fig. 7.

The arrangement of the invention shown in Fig. 7 includes a means for obtaining the number of revolutions turned by the motor. A light source 34 is focused on the face 36 of motor 4a, as shown, said face being divided into sectors by alternate strips of light-reflective and dight-absorptive material. Positioned oppositely from light source 34 is a photoelectrtic cell 35 responsive to reflected light from motor face 36. Photoelectric cell 35 is connected to a pulse counter which serves as a revolution counter and can be adapted to serve as a tachometer in a manner well known in the electronic art.

This invention also serves as a convenient device for the measurement of acceleration in space. If the mass center of the platform assembly is so located as to be non-collinear with the platform support points, by means of counterweight 33 as shown in Fig. 7, or because of inherent unbalance of the structure, as in Figs. 1 and 2, when the platform is accelerated in any direction not parallel to a plane formed by the platform support points and the mass center, and especially if it is accelerated in a direction normal to such plane, a torque proportional to such acceleration will be applied to the platform. Such torque acts in the same manner as the externally applied torque previously discribed. Therefore, the flywheel velocity is directly proportional to the first time integral of acceleration, and the flywheel position is directly proportional to the second time integral of the applied acceleration which is equal to the distance moved by the device in a direction normal to the plane formed by the platform support points and the mass center. Since the magnitude of the discriminator output voltage, as measured by voltmeter 16 in Fig. 7, or at 26 in Fig. 5, is in turn proportional to the impressed torque, such output voltage is a measure of the acceleration of the platform.

Although the invention has been described and illustrated in detail, it is to be clearly understood that the same is by way of illustration and example only, and is not to be taken by way of limitation, the spirit and scope of this invention being limited only by the terms of the appended claims.

I claim:

1. A measuring device comprising a mass pivoted about a non-centroidal axis and responsive to accelerations in a plane normal to said axis, a second mass symmetrical about the pivot axis of said first mass and rotatable with respect thereto, torque motive means for applying torque equally and oppositely to said two masses about said axis, and servo means including a position pickoff responsive to angular motion of said first mass for energizing said torque motive means in the sense required to substantially prevent angular motion of said first mass whereby the angular velocity and displacement of said second mass are proportional to the first and second integral, repectively, of the acceleration to which said first mass is subjected.

2. A device as recited in claim 1 and further including means for measuring the angular velocity of said rotating mass to thereby obtain the first integral of accelerations to which said first mass is responsive.

3. A device as recited in claim 1 and further including means for measuring the angular displacement of said rotating mass to thereby obtain the second integral of accelerations to which said first mass is responsive.

4. A device as recited in claim 1 in which the output of said servo means for controlling said torque motive means is proportional to and a measure of the acceleration applied to said first mass.

5. A device as recited in claim 1 and further including means for measuring the relative angular velocity of the masses to thereby obtain a measure of the first integral of the acceleration applied to said first mass.

6. A device as recited in claim 1 and further including means for measuring the relative angular position of the masses, whereby the relative angular displacement of the masses is a measure of the second integral of acceleration to which said first mass is responsive.

7. A device as recited in claim 1 and further comprising means for indicating the magnitude of the output of said pickoff means to thereby measure the acceleration to which said first mass is responsive.

8. A measuring device comprising a rotatable mass, a second mass rotatable about an axis not intersecting its mass center and hence responsive to accelerations in a plane normal to said axis and not intersecting said mass center, motor means for applying a torque equally and oppositely to said masses, servo means responsive to angular motion of said second mass for controlling the torque output of said motor means to prevent angular motion of said second mass due to accelerations to which it is responsive, means for supporting said masses upon an object capable of motion in space without impairing their freedom for rotation, and means for measuring the angular velocity and displacement of said first mass to thereby obtain a measure of the velocity of and distance traveled by said object in the sense in which said second mass is responsive to accelerations.

9. A measuring device comprising two masses, one of which is carried by the other with freedom for relative rotative movement, said masses being balanced about the axis of relative rotative movement, means for applying a torque to said masses, means for measuring the velocity of said one mass and the relative displacements of said two masses, means for applying a second torque to said second mass, and means for controlling said first torque so that it is at all times equal and opposite to said second torque, whereby the measured velocity is proportional to the first integral of said torque and the measured displacement is proportional to the second integral of said torque.

10. A measuring device comprising a support, an electrical motor-generator having a frame pivotally mounted on said support, said motor-generator means being rotatably mounted on said frame with its axis of rotation parallel to the pivotal mounting of said frame, electronic servo means for supplying to said motor an electromotive force proportional in magnitude to the difference between the output of said generator and an arbitrarily varying electrical signal which is to be differentiated, position pickoff means for measuring the angular deflection of said frame in response to rotation of said motor, actuator means for applying a reactive torque to said frame proportional to said deflection and equal and opposite to the torque produced by rotation of said motor, and electrical means for measuring the effort required to supply said reactive torque whereby the said measure of effort required is proportional to the first derivative of the said signal to be differentiated.

11. A device as recited in claim 10 in which said means for supplying electromotive force to said motor comprises means for comparing the output signal of said generator with said arbitrarily varying electrical signal, means for producing a third signal proportional to the difference between said compared signals and means for amplifying said third signal.

12. A device as recited in claim 10 in which said means for applying said reactive torque comprises lever means, position detecting means attached to said lever means, an electromagnetic coil attached to said lever means, electromagnets attached to said support and operatively positioned with respect to said electromagnetic coil to for a magnetic null when said position detecting means is in neutral position, means for producing an electrical signal proportional to the deflection of said position detecting means from neutral position, means for amplifying said signal and means for applying said signal to said electromagnetic coil and electromagnets whereby the force produced by the interaction of said coil and electromagnets furnishes said reactive torque.

13. A measuring device comprising an electric motor whose frame is supported about an axis parallel to the axis of rotation of the motor, position pickoff means for producing a voltage proportional to the angular displacement of said motor, electrical comparator means for supplying to said motor an electromotive force proportional in magnitude to the difference between the said angular displacement voltage and an arbitrary voltage which varies according to some function to be differentiated, actuator means for applying to said frame a reactive torque proportional to the deflection of said frame and equal and opposite to the torque produced by the rotation of said motor, and electrical meter means for measuring the effort required to supply said reactive torque whereby the said measured effort is proportional to the second differential of the said function to be differentiated.

14. A device as recited in claim 13 in which said means for supplying electromotive force to said motor comprises means for comparing said angular displacement voltage and said arbitrary voltage, means for producing a third voltage proportional to the difference between said compared voltages, and means for amplifying said third voltage.

15. A device as recited in claim 13 in which said means for applying said reactive torque comprises lever means, an electromagnetic coil attached to said lever means, position detecting means attached to said lever means, electromagnets attached to said support operatively positioned with respect to said electromagnetic coil to form a magnetic null when said position detecting means is in neutral position, position pickoff means for producing an electrical signal proportional to the deflection of said position detecting means from neutral position, amplifier means for amplifying said signal, and electrical conductive means for applying said signal to said electromagnetic coil and electromagnets whereby the force produced by the interaction of said coil and electromagnets furnishes said reactive torque.

16. A method of measuring comprising applying a torque to two independent masses, one of which is subject to acceleration forces, measuring the velocity of the other of said masses and the relative displacement of one of said masses with respect to the other, and controlling the torque applied to said masses by electronic servo means so that it is at all times equal and opposite to that produced by accelerations to which said one mass is subjected.

17. A method of measuring as recited in claim 16 in which said measured velocity is a measure of the first integral of said torque.

18. A method of measuring as recited in claim 16 in which said relative displacement is a measure of the second integral of said torque.

19. A method of measuring as recited in claim 16 in which said measured velocity is a direct measure of the first integral of said acceleration.

20. A method of measuring as recited in claim 16 in which said relative displacement is a measure of the second integral of said acceleration.

21. A measuring device comprising reference frame means having freedom for angular movement in one plane only, a rotatable mass carried by said reference means on an axis parallel to the axis of freedom for rotative movement for said reference frame means, motor torque means for rotating said mass, angular pickoff means for measuring the angular velocity and displacement of said rotating mass, pickoff means for measuring the displacement of the reference means, and electronic servo means responsive to the displacement of the reference means for controlling the motor means for rotating the mass to thereby integrate the torque for rotating the mass.

22. A measuring device comprising reference frame means, rotational inertia means carried by said reference means and adapted to be rotated with respect thereto, motor means for rotating said inertia means to thereby induce a reactive torque in said reference means, pickoff means for measuring the displacement and velocity of said inertia means, means for applying to said reference frame about the axis of said inertia means a torque to be integrated, pickoff means for measuring the displacement and velocity of said reference means in response to said torque, and servo means responsive to the displacement of said reference means for controlling said motor means whereby the angular velocity and displacement of said inertia means are proportional to the first and second integral, respectively, of said torque to be integrated.

23. A measuring device comprising a rotatable mass, a second mass rotatable about a non-centroidal axis and hence responsive to accelerations, motor means for applying a torque equally and oppositely to said masses, electronic servo means for controlling said torque means so as to apply to said second mass at all times a torque equal and opposite to that produced by accelerations to which it is subjected, rigid frame means for supporting said masses upon an object capable of motion in space, and position pickoff means for measuring the angular displacement of the said first mass to obtain thereby the distance traveled by the object in the sense in which said second mass is responsive to accelerations.

References Cited in the file of this patent
UNITED STATES PATENTS

| | | |
|---|---|---|
| 2,109,283 | Boykow | Feb. 22, 1938 |
| 2,210,970 | Bonell | Aug. 13, 1940 |
| 2,338,732 | Nosker | Jan. 11, 1944 |
| 2,371,626 | Keeskemeti | Mar. 20, 1945 |